Figure 22:
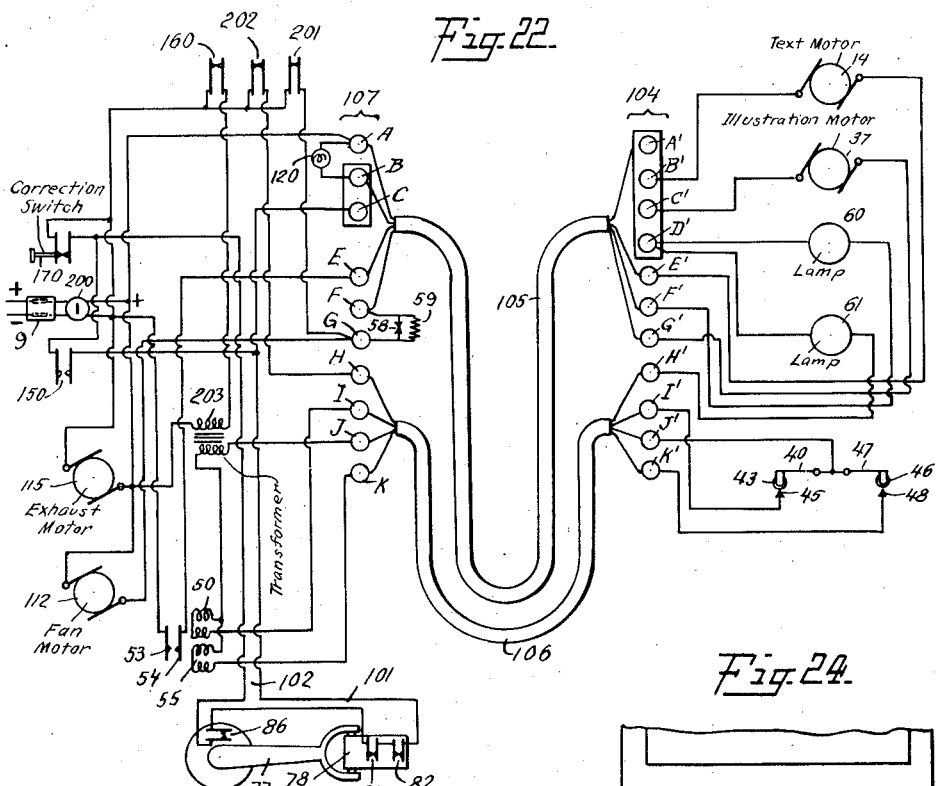

April 23, 1935.  A. E. WIER  1,998,889
PROJECTING APPARATUS
Filed Jan. 3, 1933  9 Sheets-Sheet 1
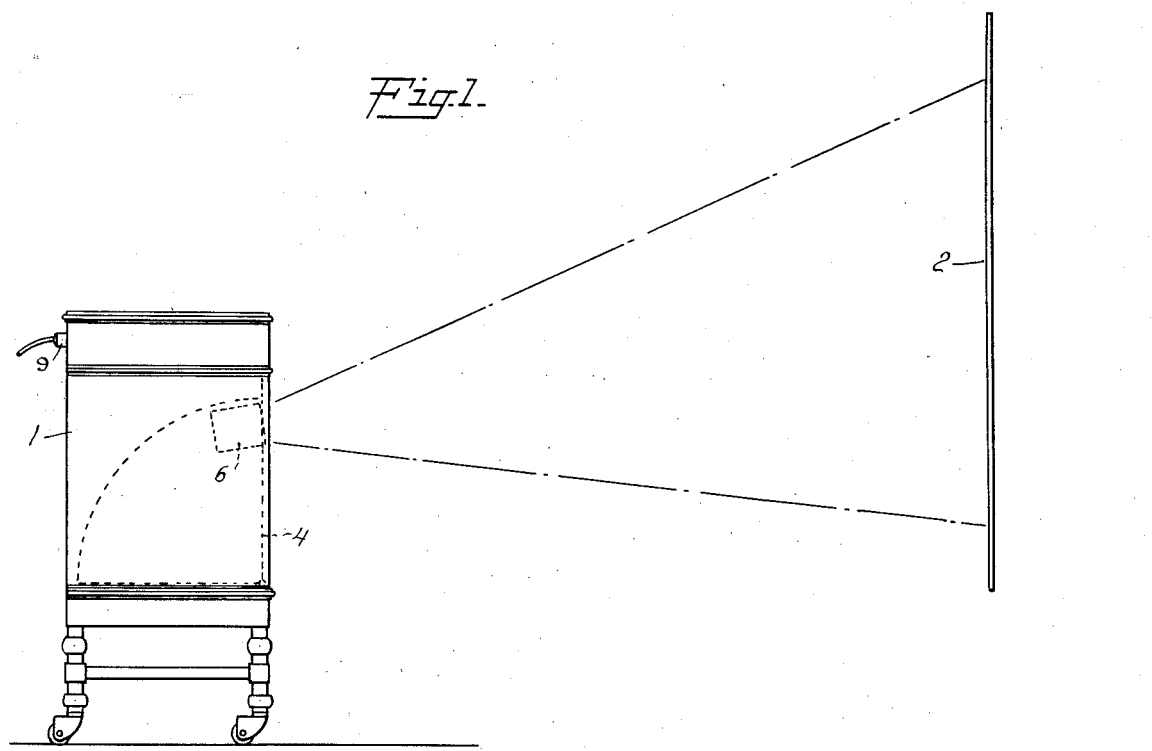
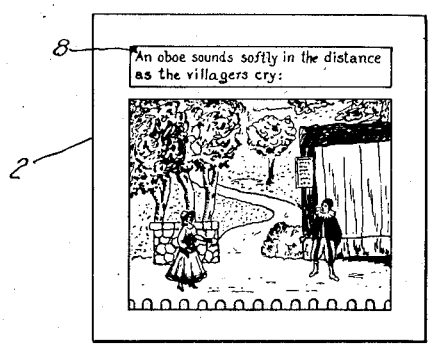
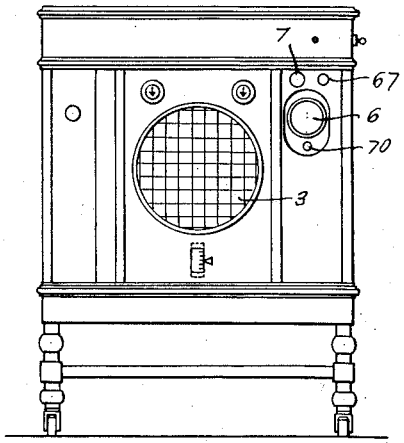
INVENTOR
ALBERT E. WIER
BY
ATTORNEYS April 23, 1935.   A. E. WIER   1,998,889
PROJECTING APPARATUS
Filed Jan. 3, 1933   9 Sheets-Sheet 2
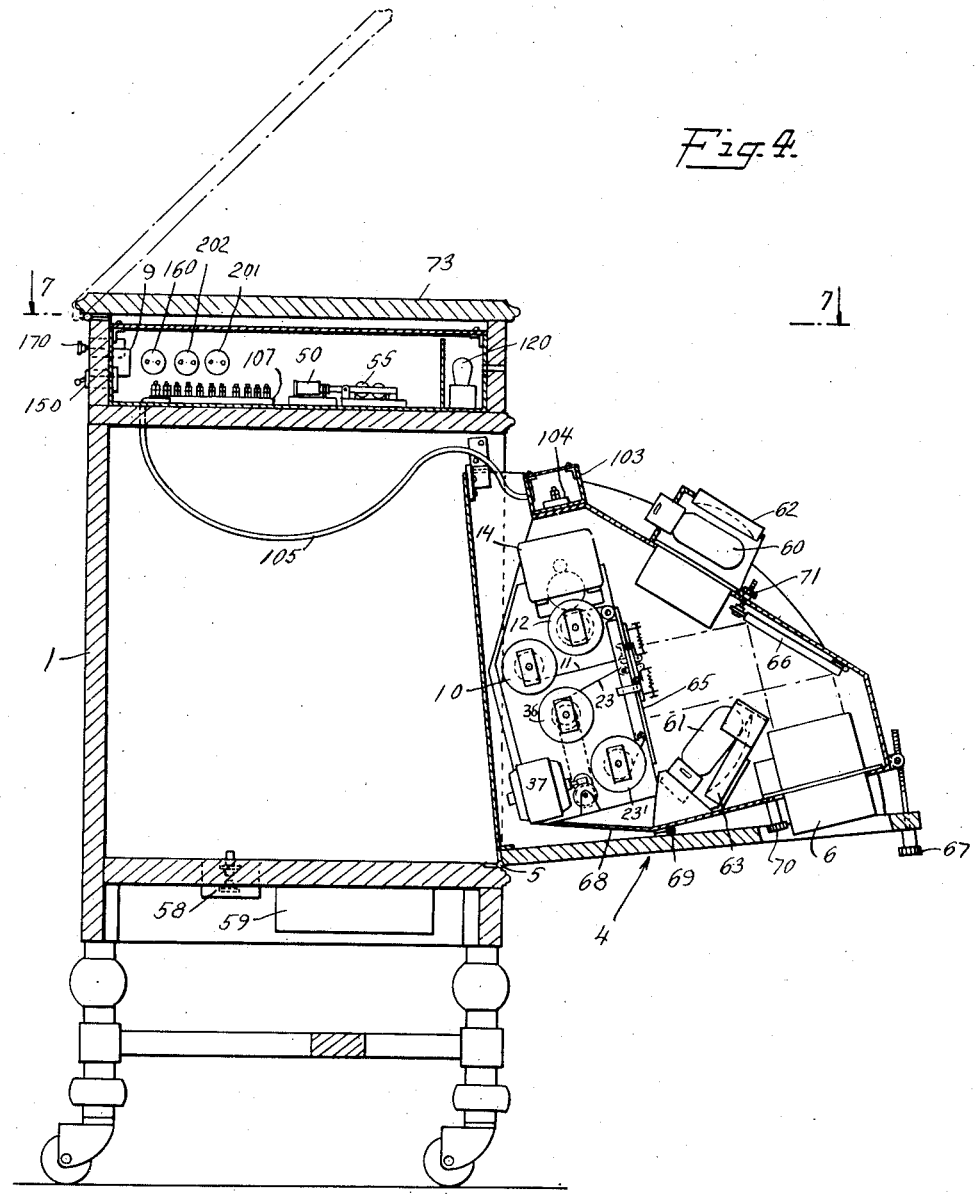
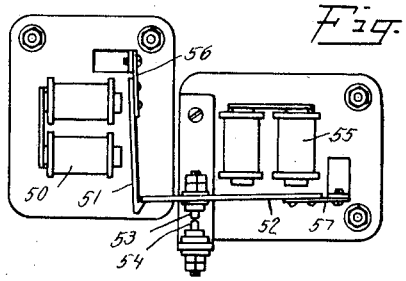
INVENTOR,
ALBERT E. WIER
BY
ATTORNEYS April 23, 1935.  A. E. WIER  1,998,889
PROJECTING APPARATUS
Filed Jan. 3, 1933   9 Sheets-Sheet 3
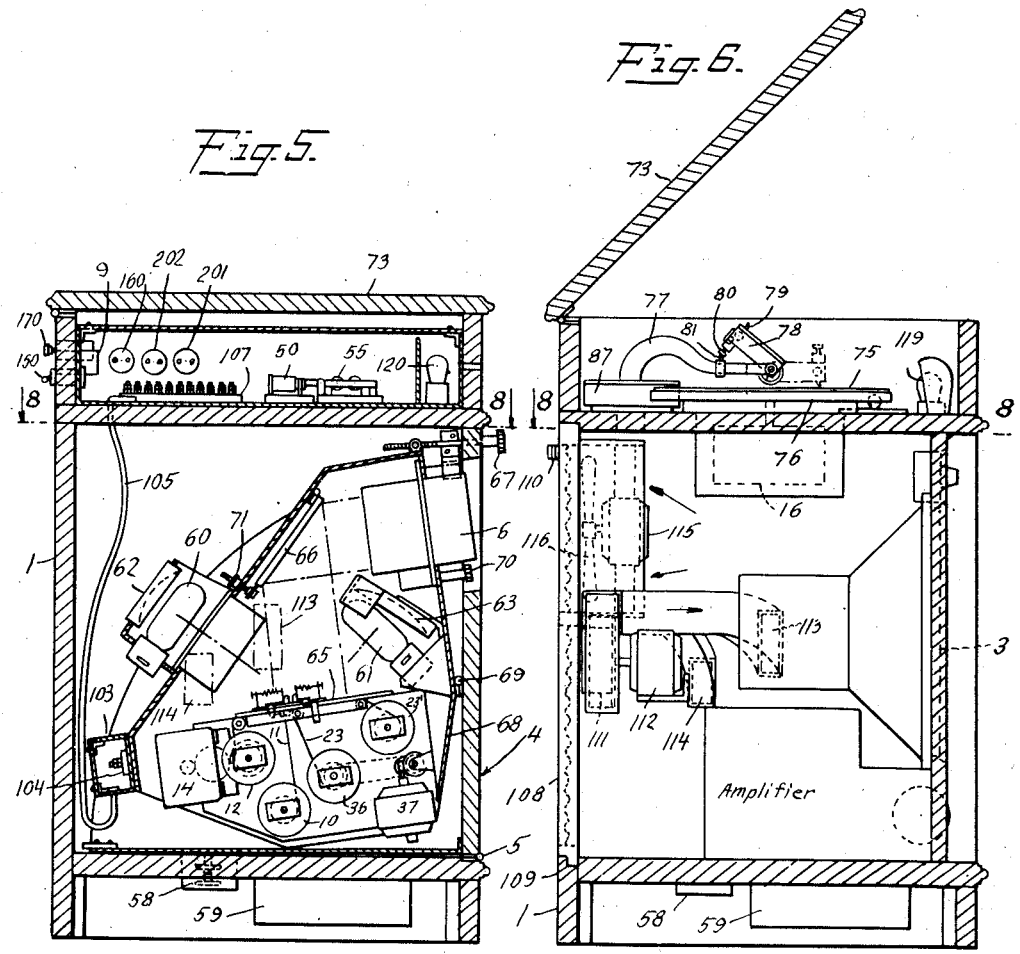
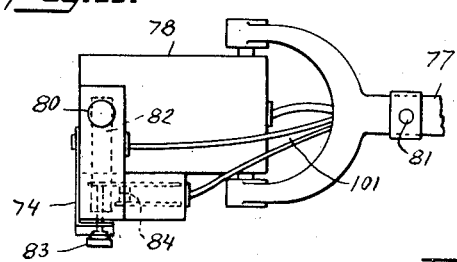
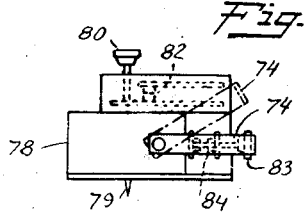
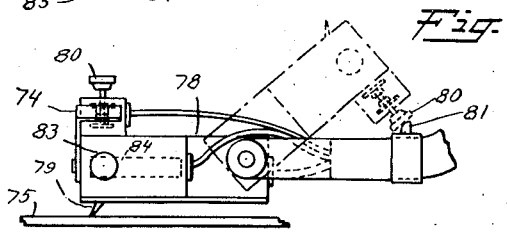
INVENTOR
ALBERT E. WIER
ATTORNEYS

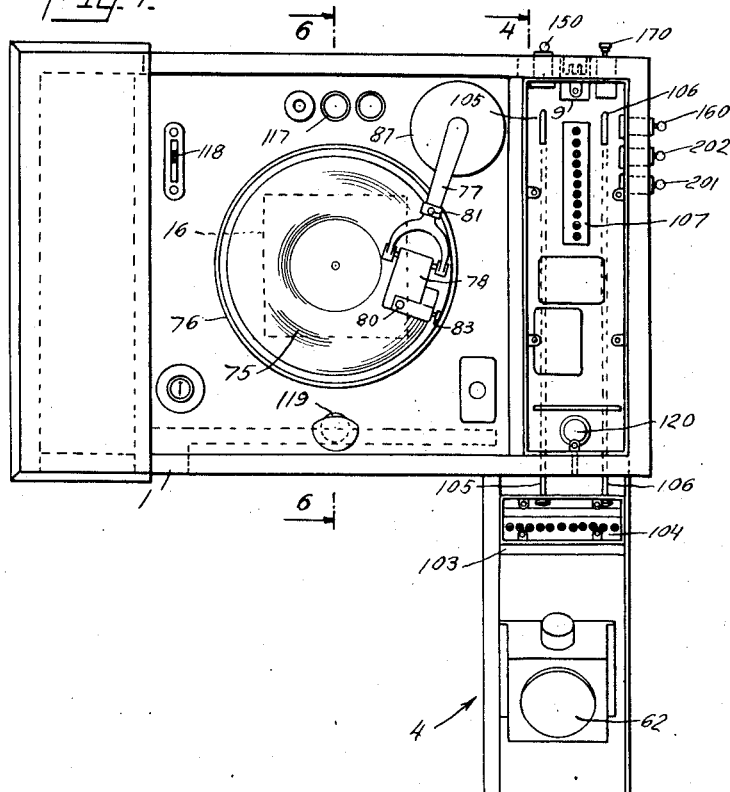
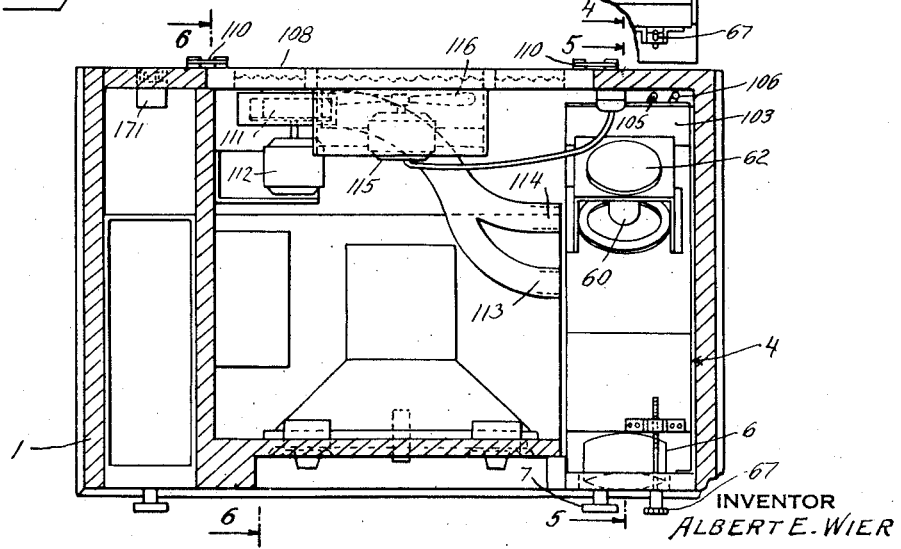

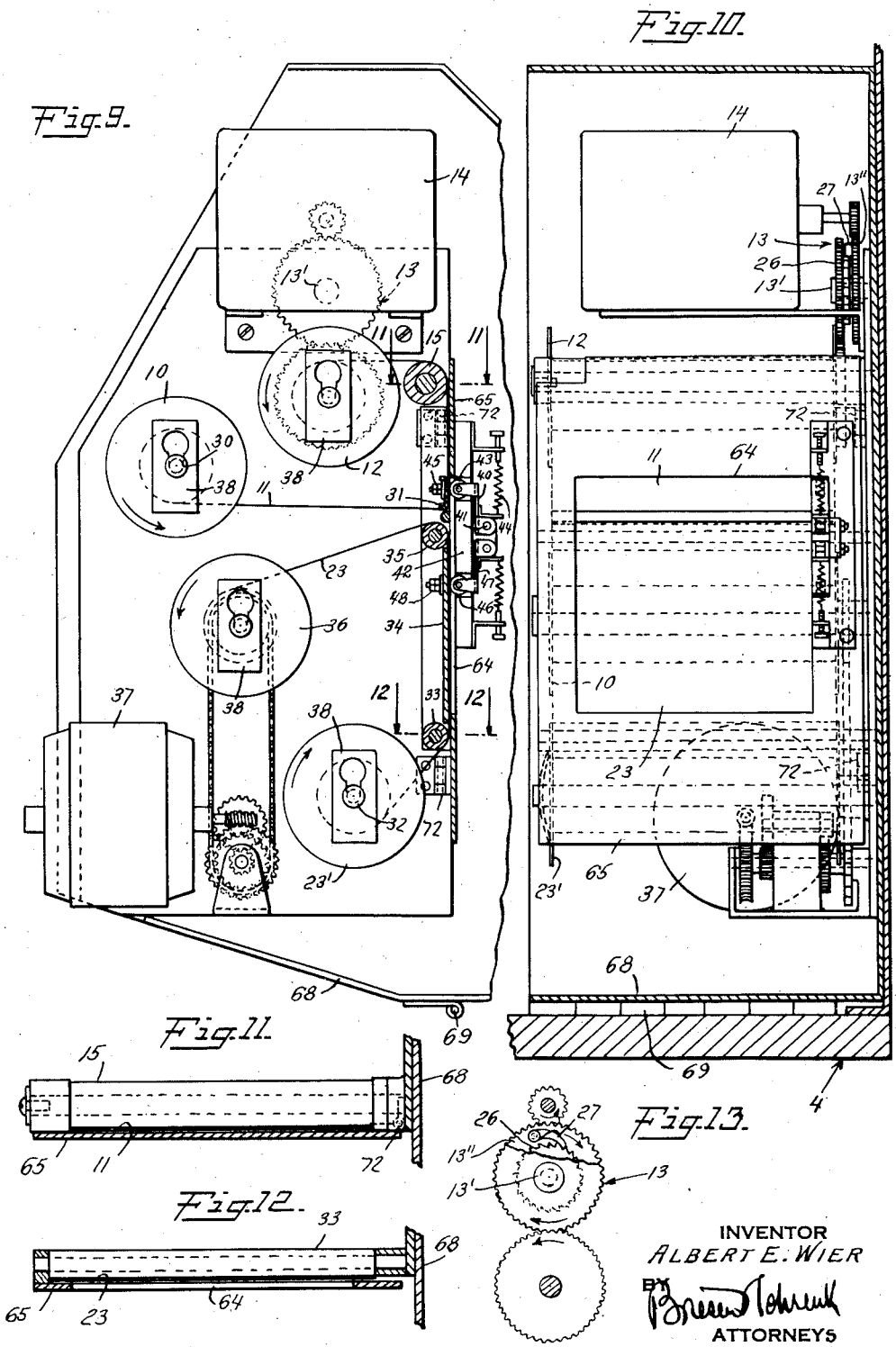

April 23, 1935. A. E. WIER 1,998,889
PROJECTING APPARATUS
Filed Jan. 3, 1933 9 Sheets-Sheet 6
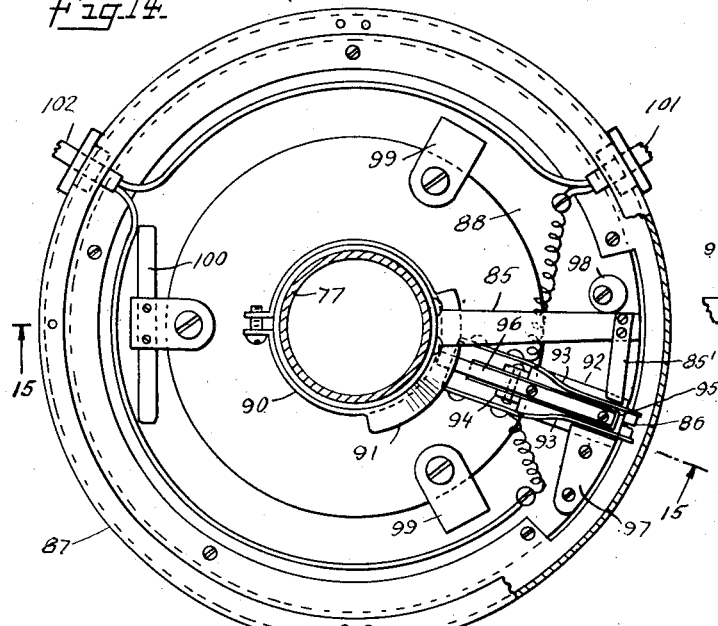
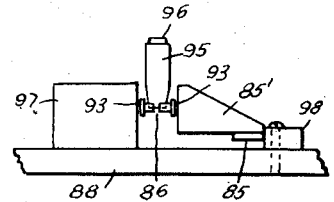
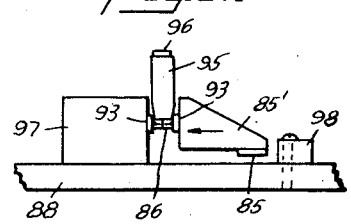
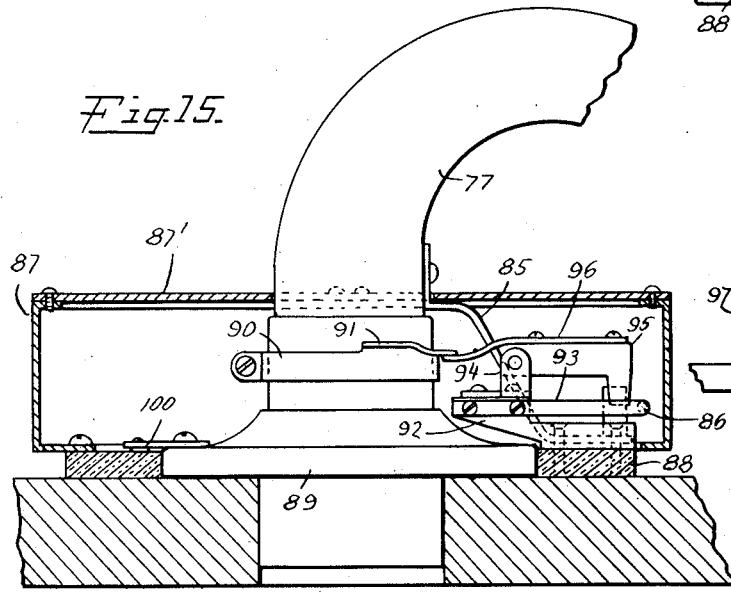
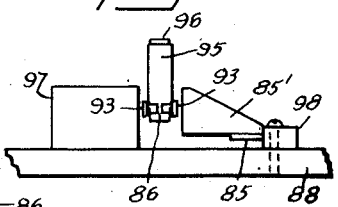
INVENTOR
ALBERT E. WIER
BY
ATTORNEYS April 23, 1935.  A. E. WIER  1,998,889
PROJECTING APPARATUS
Filed Jan. 3, 1933  9 Sheets-Sheet 7

INVENTOR
ALBERT E. WIER
BY
ATTORNEYS

April 23, 1935.  A. E. WIER  1,998,889
PROJECTING APPARATUS
Filed Jan. 3, 1933   9 Sheets-Sheet 8

INVENTOR
ALBERT E. WIER
BY
ATTORNEYS

April 23, 1935. A. E. WIER 1,998,889
PROJECTING APPARATUS
Filed Jan. 3, 1933 9 Sheets-Sheet 9
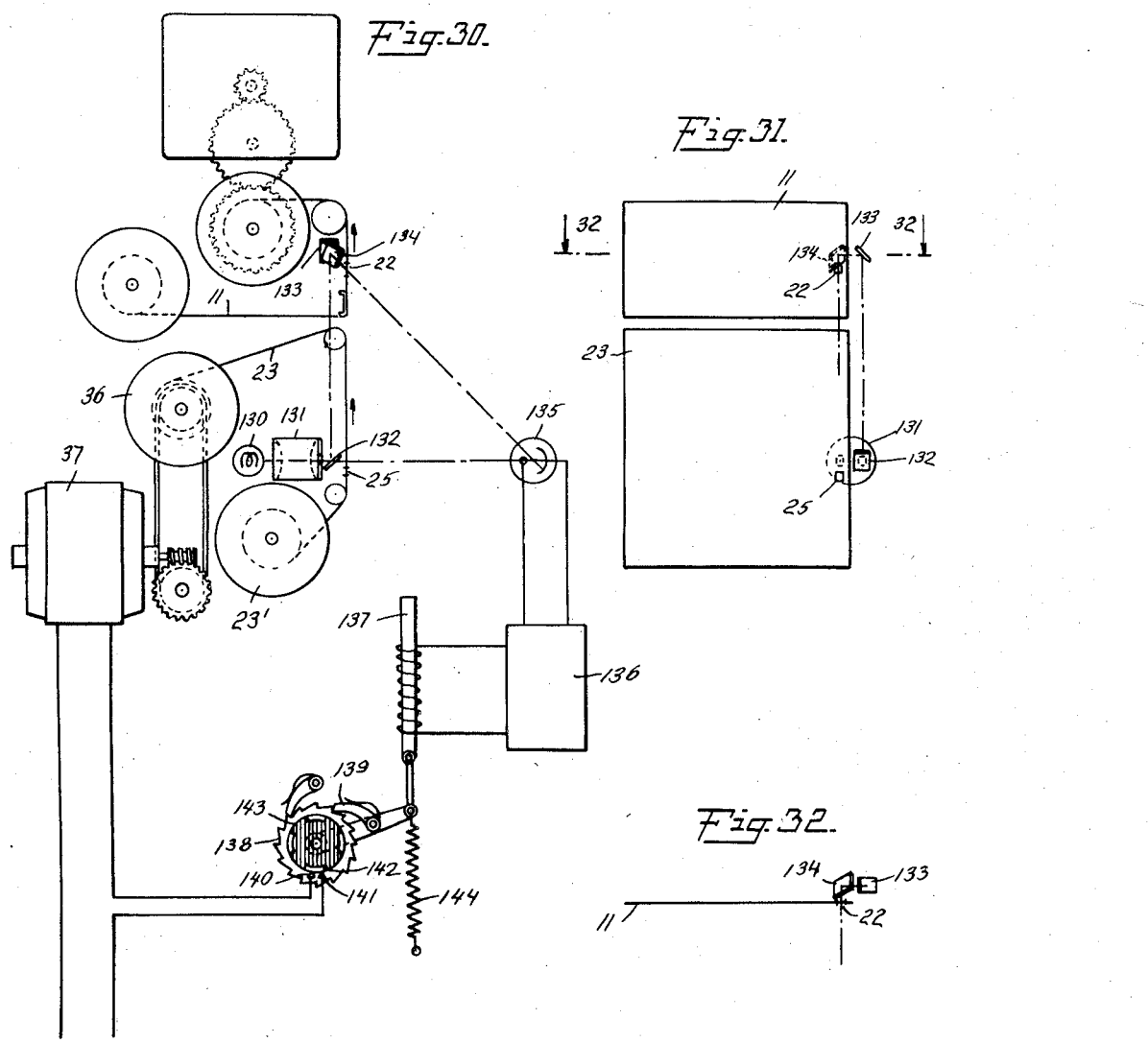
INVENTOR
ALBERT E. WIER
BY
ATTORNEYS Patented Apr. 23, 1935

1,998,889

UNITED STATES PATENT OFFICE 1,998,889

PROJECTING APPARATUS

Albert E. Wier, Brooklyn, N. Y.

Application January 3, 1933, Serial No. 649,867

29 Claims. (Cl. 88—28)

This invention relates to apparatus adapted to project upon a screen informative matter such as writings, symbols, printed matter, musical scores, illustrations, etc. carried on interchangeable rolls. One object of the invention is to cause such projection of such material to be displayed in predetermined time relation with reference to an effect to be produced. Generically the object of the invention is to make available an educational or informatory system whereby the human eye, preferably simultaneously with the ear, receives impressions without strain or effort and in such a manner as to impress themselves on the mind.

In the following specification the invention will be described as specifically employed in the performance of an opera, since apparatus capable of rendering such performance embodies all the elemental working parts which are necessary for projecting other types of instructive informatory or entertaining material.

The apparatus is so arranged as to project upon the screen, in the case of the projection of text or printed matter, a slowly advancing sequence of lines of a length and at a rate such that the eye can readily absorb the words as the lines of enlarged print are advancing, so that if, for example, the apparatus is used for projecting a book or a story, the reader can sit at ease and observe the enlarged words and letters of the text unfold themselves line after line at a speed coordinated with the reading speed capacity of the observer.

In the case of a lecture or the like the text may be synchronized with illustrations arranged to appear on the screen at the appropriate moments and to remain visible for as long a period as the editor may decide to allow. The same is true in the case of a musical composition or an opera where the music is synchronized with the text, the text appearing on the screen in exact correspondence with the individual musical passage to which it is related, while illustrations of typical sections may also appear as the actions or scene to which the music is pertinent undergoes a change.

The device in question opens up new fields of education and enjoyment and brings to music lovers and students effects never before attained, such for example as the rendition of a musical composition with simultaneous visibility of the text in any appropriate language or of the score so that as the ear absorbs the harmonies the eye will aggregate information usually missed or unobserved.

Figure 23:
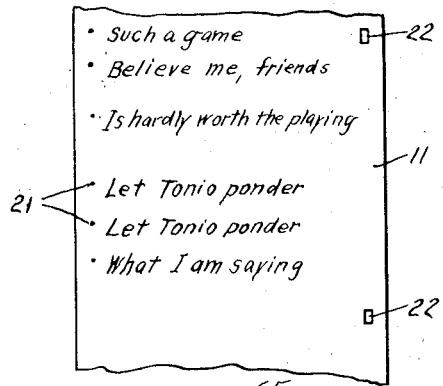
Figure 25:
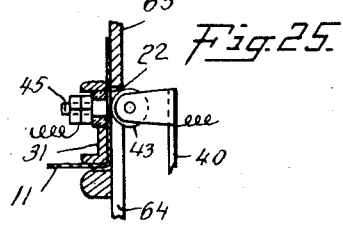
Figure 24:
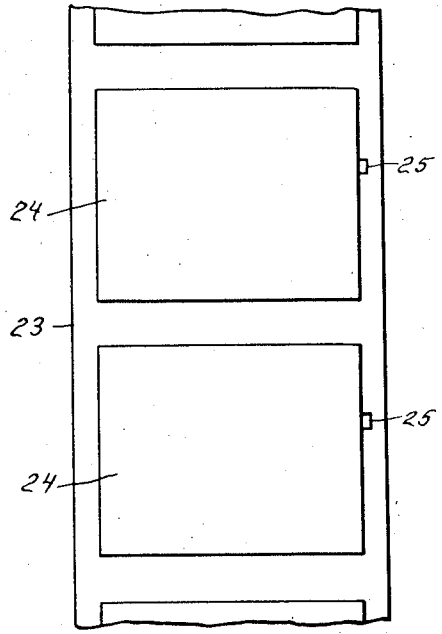
Figure 27:
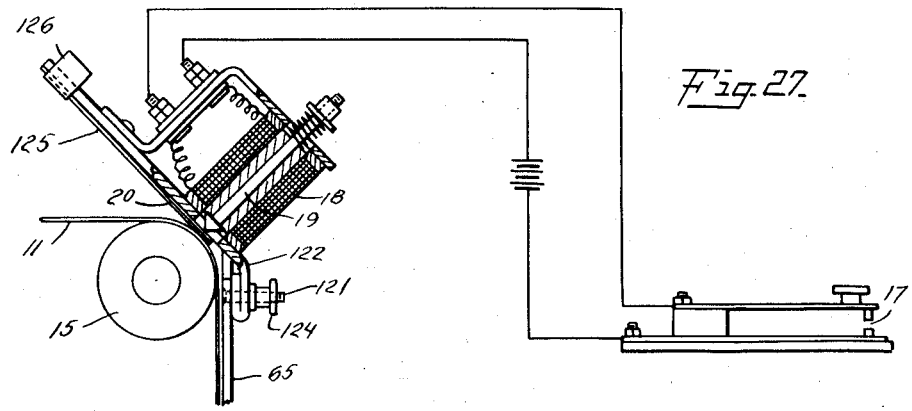
Figure 29:
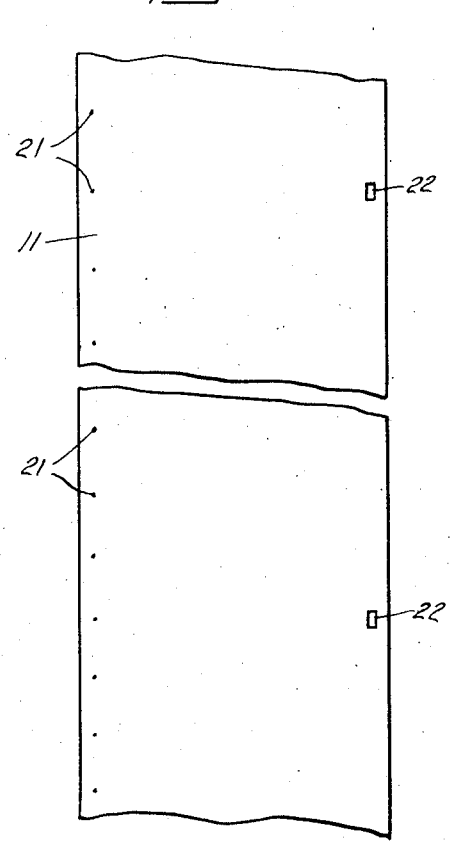
Figure 28:
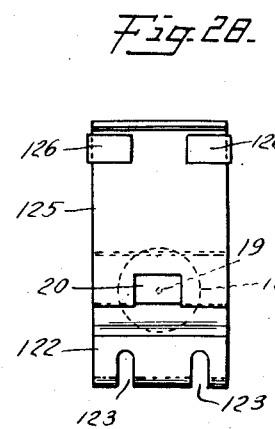

One embodiment of the invention is illustrated in the accompanying drawings in which Fig. 1 is an elevational view of the cabinet and screen. Fig. 2 represents a specimen of text and illustration as projected on the screen at one particular moment. Fig. 3 is a front view of the cabinet which houses the tone-emitting mechanism and the optical projecting means for text and illustration. Fig. 4 is a sectional view on line 4—4 of Fig. 7 illustrating parts of the optical projecting mechanism and the associated text and illustration rolls in a position where the rolls are accessible for removal or insertion. Fig. 5 is a sectional view on line 5—5 of Fig. 8 showing the optical projecting mechanism in the position where the images are projected toward the screen as indicated in Fig. 1. Fig. 6 is a sectional view on the line 6—6 of Figs. 7 and 8, showing details of the interior of the cabinet. Fig. 7 is a plan view of Fig. 4 showing the text and illustration projecting part of the device in its non-projecting position. Fig. 8 is a sectional view on lines 8—8 of Figs. 5 and 6. Fig. 9 is a detailed elevational view partly in section, enlarged with reference to corresponding parts shown in Fig. 4, and illustrating details of the text and illustration rolls. Fig. 10 is an elevational view partly in section taken at right angles to Fig. 9. Fig. 11 is a sectional view on line 11—11 of Fig. 9. Fig. 12 is a sectional view on line 12—12 of Fig. 9. Fig. 13 is a detailed view of the clutch associated with the text roll. Fig. 14 is a plan view partly in section of the housing for the tone-arm support and its associated switches. Fig. 15 is a sectional view on line 15—15 of Fig. 14. Figs. 16, 17, and 18 are various views of the positions of the switch shown in Fig. 14 controlled by the position of the tone arm. Fig. 19 (Sheet 3 of the drawings) is a plan view enlarged with respect to the showing of the corresponding parts in Fig. 7 of the needle-carrying parts of the tone arm. Fig. 20 is an end elevation of Fig. 19. Fig. 21 is a side elevation of Fig. 19. Fig 22 is a wiring diagram of the several electric circuits of the apparatus. Fig. 23 is a portion of the text roll. Fig. 24 represents a portion of the illustration or picture roll. Fig. 25 is a sectional detail of the switch operated by apertures of the text and illustration rolls enlarged with reference to the showing of corresponding parts of Fig. 9. Fig. 26 (on Sheet 2 of the drawings) illustrates the switch control for automatic harmonious progression of the illustration roll in harmony with the progress of the text roll. Fig. 27 is a detail of the means employed for recording the proper position of the text roll. Fig. 28 is an elevation of the recording end of Fig. 27 looking toward the point of the recording stylus. Fig. 29 represents the text roll master sheet in the condition as affected by the recording stylus of Fig. 27. Fig. 30 represents a photoelectric modification of the mechanical switches illustrated in Figs. 9 and 25. Fig. 31 is a front elevation of corresponding parts of Fig. 30 and Fig. 32 is a view on line 32 of Fig. 31.

The apparatus, generally speaking, comprises a cabinet 1 and a screen 2. The cabinet houses tone-producing mechanism illustrated in Fig. 6 as comprising a disc phonograph record 75, a reproducing needle 79, a tone arm 77, and amplifiers. The tonal waves are emitted from the cabinet through the loud speaker section 3. The cabinet 1 is shown as containing a swinging drawer or pivoted portion 4, pivoted at 5, and adapted to be swung into the position shown in Fig. 4 for the insertion or removal of the text and illustration rolls and then to be swung back into the position shown in Figs. 1, 3, and 5 in which position the apparatus is ready to project the text and illustrations through the lens 6 toward the screen 2.

In order to move the pivoted section 4 from the position shown in Fig. 5 to the position shown in Fig. 4, the operator pulls on knob 7 (Figs. 3 and 8), the weight of the contents of section 4 sufficing to maintain the parts in either of the two positions of said section.

In the open position of the drawer 4 the text roll 11 and the illustration roll 23 are inserted in their proper positions; the drawer 4 is then swung back, the appropriate phonograph record is placed on the turn table 76, and the apparatus is ready for the projection of the opera.

Inasmuch as the text rolls and illustration rolls are of a special type, a more ready comprehension of the invention will be obtained if the preparation of said rolls is now described. Such preparation of these rolls is initiated by an editor, musically skilled, first selecting the particular opera to be reproduced, for instance "Pagliacci". Complete sets of records, reproducing the entire opera, are available from several sources and the reproduction of the opera in each set differs from the reproduction or rendition thereof in any other set. The editor, after selecting the particular opera, marks on the score of the opera the beginning of each phrase of the text and also, when desired, the beginning of each musical passage, without text. He then takes his set of records and places record Number 1 on the turn table 76. A roll of paper wound on a roller with the free end of the paper attached to a corresponding roller is inserted in its proper place in the pivoted drawer 4 in the manner shown by the position of the reel 10 in Fig. 9. The end of the paper 11 from the reel 10 is attached to the take-up reel 12 which is rotatable through a train of gears 13 operated by the motor 14. The recording instrumentalities shown in Fig. 27 are placed in position in a manner to be hereafter described so as to affect the paper 11 as it passes over the roller 15. The motor 14 is a motor synchronized with the motor 16 which controls the phonograph turn table. The editor now closes the proper switches to start the phonograph record playing and to have the paper 11 drawn from the reel 10 on to the reel 12. Exactly at the beginning of each sung phrase as reproduced by the phonograph, the editor depresses the switch 17 (Fig. 27), energizing the magnet 18 and causing the solenoid stylus 19 to press down upon carbon paper 20, making marks 21 (Fig. 29) on one edge of the paper sheet. The depression of the switch 17 is merely a momentary one at the beginning of each phrase of the text. For example, in a portion of the text of Pagliacci which reads as follows:

"Such a game, believe me friends, is hardly worth the playing. Let Tonio ponder, let Tonio ponder what I am saying." the editor will record by marks 21 the beginning of the phrase . Such a game and
. Believe me friends and
. Is hardly worth the playing. and
. Let Tonio ponder and
. Let Tonio ponder and
. What I am saying.

Proceeding in this manner through the entire record, it is obvious that the spacing between marks 21 will be quite irregular but will be in exact registry with the beginning of each phrase of the text as recorded on the phonograph record. Whenever in such a record there are passages of orchestration unaccompanied by text there need be no marks 21 at all, but just as soon as one of the characters in the opera begins to speak or sing, the placing of the dots 21 again begins. After the editor has placed the marks 21 on the paper sheet 11 as described, and the record has finished playing, and stopped (automatically disconnecting the corresponding electric circuits as will be hereafter described) the reels 10 and 12 may be taken from the drawer 4 and the paper sheet 11 rewound from reel 12 on to reel 10. Usually, however, a single paper roll accommodates the entire opera as reproduced on a series of disc records so that the editor merely changes the records and goes on with making marks 21 until the end of the opera is reached. The editor thereupon applies the actual words of the several phrases of the text to the paper sheet 11 near the marks 21 generally in the manner illustrated in Fig. 23. At appropriate parts of the performance wherever a change of scene is involved or illustrations are to appear, the editor indicates this condition by an appropriate mark or perforation 22 (Fig. 29). The illustrations are generally a series of pictures prepared in advance to cover the salient situations involved in the visualization of scenes of that part of the opera which the particular phonograph record reproduces and as several of these illustrations are frequently selected for reproduction during orchestral passages, the editor will place the marks 22 on the paper 11, sometimes in association with text and at other times in association with music unaccompanied by text.

The master roll having been produced in this fashion is then accurately reprinted with respect to the spacing of the several parts of the text and the perforations 22 for the appropriate appearance or change in illustration and the printed reproduction of these rolls are then ready for distribution for use by operators generally. The editor may in the first instance reproduce in connection with each set of records of each opera as prepared by each one of the several manufacturers of phonograph discs the steps thus far recited but this initial labor once performed will stand good for as many reproductions or printed rolls as there may be demand for. The user of the appliance will, of course, use printed rolls appropriate to the particular make of record which he uses, said rolls to be appropriately marked to identify them with the several makes of record.

In the further description of the present invention the text roll 11 will constantly be a text roll such as has been described.

The illustration roll 23 is made up, generally speaking, in the manner illustrated in Fig. 24, the several illustrations 24 to be used being mounted or printed in sequence on a strip of paper with apertures 25 adjacent to each picture. An electrical system to be hereafter described and functioning through the apertures 22 of the text roll and 25 of the illustration roll, will cause the pictures 24 to be advanced whenever the appropriate aperture 22 of the text roll indicates that the previous illustration should be replaced by a succeeding illustration.

The text rolls and the illustration rolls having been prepared for use, they are now inserted in their proper place in the drawer 4 of the cabinet 1. To accomplish this the drawer 4 is first moved into the open position shown in Fig. 4, the text roll is slipped over the shaft 30 (Fig. 9), and the paper 11 threaded over a plate 31 having rounded corners, around the roller 15, the end of the paper being attached in any convenient manner to the reel 12. The reel 23', carrying illustration roll 23, is slipped over spindle 32 and the end of the paper is drawn over the roller 33, the plate 34, and the roller 35, the end of the paper 23 being affixed in any convenient manner to the reel 36. Movement of the reel 36, sufficient to displace one picture at a time, is derived from motor 37 whenever said motor is caused to be actuated under control of the apertures 22 of the text roll. Removable pressure clips 38 hold the several rolls in position on their respective spindles during the progress of operations and until the time comes to change the rolls.

As seen in Fig. 9, a bell crank lever 40, pivoted at 41, mounted on an insulated support 42, carrying a roller 43 at its free end, is pressed under tension of the spring 44 against the edge of the paper roll 11 in line with its apertures 22. Whenever the roller 43 of the bell crank lever rides over one of the apertures 22 of the text roll 11, it is able to make contact with the terminal 45 (see Fig. 25). The contact 45 is carried by but insulated from the plate 31. The electrical connection established through contact 45, roller 43, and lever 40, as shown in the wiring diagram (Fig. 22) to be explained more in detail hereinafter, energizes motor 37 (Fig. 9) and causes rotation of the reel 36 and the corresponding advancement of the illustration roll 23 whenever the next succeeding aperture 25 of the illustration roll reaches the point where the roller 46 of bell crank lever 47 descends to make contact with the terminal 48, and the electric circuit which allows the motor 37 to operate, is thereby interrupted. The means to accomplish this result are illustrated in Fig. 26. In Fig. 26 the magnets 50 are energized only when the contact roller 43 of the bell crank lever 40 has made contact with the terminal 45 through one of the apertures 22 of the text roller 11. Whenever this occurs the hooked armature 51 is moved toward the magnets 50, releasing the armature 52. The armature 52 carries the contact 53, which thereupon contacts with 54 and closes the circuit to the motor 37 which operates the illustration rolls. When thereupon the roller 46 of the bell crank lever 47 makes electric contact with terminal 48 through the next aperture 25 of the illustration roll 23, the magnets 55 of Fig. 26 are energized, drawing up the armature 52. In the meantime the text roller having advanced and thereby broken the electric connection between roller 43 and terminal 45, the armature 51 has been released from the magnets 50 and is swung under influence of its spring support 56 to the position shown in Fig. 26.

The motor 37 will function until its circuit is broken by contact between roller 46 and terminal 48, but the momentum of the armature of the motor will move the illustration roll so that its aperture 25 will be carried slightly beyond the point where roller 46 can make contact with terminal 48, whereupon the magnets 55 will be deenergized and the armature 52 be retracted by its spring support 57 against the hook of the armature 51, the parts thereafter remaining in said position, electrically inert until the next aperture 22 of the text roll 11 passes under the roller 43.

After the text and illustration rolls have been inserted in their proper places, the arrangement will be that illustrated in Fig. 4. The drawer 4 is swung into the position shown in Fig. 5. Lamps 60 and 61 and reflectors 62 and 63 illuminate the face of the two rolls at their points of exposure through the aperture 64 in shutter 65 (see Fig. 10). The images from the respective rolls are reflected from mirror 66 (Fig. 5) through the lens 6.

Screw control 67 enables the entire frame 68 which carries all of the mechanism within the drawer, to be moved on pivot 69 without disturbing the position of the drawer 4, so that the image can be properly positioned on the screen. Screw control 70 is provided to secure proper focus. Screw control 71 is used to secure initial accuracy of position of mirror 66 with relation respectively to the exposed parts of the paper 11 and 23 and the lens 6. The apertured plate 65 is pivoted at 72 (Fig. 9) to enable it to be swung to one side during the operation of threading the paper sheets 11 and 23 during installation or removal of the rolls.

The several parts thus far described, in the position shown in Fig. 5, are now ready to function.

The phonograph disc 75, pertinent to the particular text and illustration rolls, is placed upon the turn table 76. The end of the tone arm 77 is forked as shown in Fig. 19 and journalled in the forked ends is the needle carrier 78. The needle is designated as 79. In the normal position of the needle carrier 78 when the machine is not playing, the needle carrier is in the position shown in Fig. 6 and in dotted lines in 21. In this position the switch button 80 rests upon stud 81, causing the contacts 82 to be separated and thereby opening the circuit which controls the motor 14 of the text-roll-advancing mechanism so that so long as the position of the needle carrier 78 is that of Fig. 6 (or the dotted position of Fig. 21), the text roll will not advance. The motor 16, which drives the turn table, is synchronized with motor 14 which advances the text roll. The record on table 76 is now caused to be rotated by operating the starting switch. As soon as the performance is to begin, the operator moves the needle carrier 78 from the dotted line position of Fig. 21 to the full line position of Fig. 21 by placing one finger on the switch button 83 and depressing said button to spread apart the electric terminals 84 during the motion of the needle carrier 78 in its journals. This operation prevents closing the circuit of motor 14 notwithstanding the fact that the contacts 82 are closed during this interval. When the needle 79 has been placed on the record in the proper position to begin playing, the operator removes his finger from button 83, closing the circuit to the motor 14 and from then on all the several parts, that is the music, the text, and the illustrations, progress in complete synchronism and inter-relation.

As the tone arm 77 is swung to the position for first contact between the needle and the grooves of the disc 75, the bracket 85 (see Fig. 15) attached to the tone arm is moved to a position illustrated in Fig. 17 where the contacts 86 are closed. The closing of these contacts 86 completes the circuit through the switches 82 and 84 (Figs. 19 and 21) to start the operation of the text motor 14. The tone arm 77 has associated with itself a housing 87 supported on insulated friction ring 88 and movable with the tone arm. Within this housing the stationary support 89 for the tone arm carries a sleeve 90 having a projecting cam surface 91. Carried by the insulating friction ring 88 is a block 92. The block 92 supports the spring blades 93 at the ends of which the contacts 86 are situated. The block 92 also carries the ears 94 within which is pivoted an insulated dog 95. To the upper surface of the dog is attached a finger 96 which, when the dog is in its upper inoperative position shown in Fig. 15, is in contact with the underside of the cam surface 91 of the sleeve 90. A block 97 on the ring 88 serves as an abutment member when the switch 86 is closed, due to pressure from arm 85 transmitted through finger 85'. The operation of the foregoing instrumentalities is such that as the needle carrier 78 is swung to the performance position, the bracket 85 is moved to a position where its end finger 85' presses one of the spring blades which carries contact 86 toward the other corresponding spring blade, forcing the contacts 86 together against the resistance of the block 97. The dog 95, being slightly tapered, does not interfere with the foregoing operations as visible from Fig. 17. When, however, the record reaches its end and the needle begins to enter the shut-off groove of the record, the tone arm, no longer under the constant urge of the regular tone-producing grooves, teeters slightly in its bearings and thereby causes release of pressure against the finger 85'. Any such release of pressure enables the dog 95 now under the high part of the cam 91 to descend between the blades 93 and correspondingly break the circuit at 86 and keep it broken thereafter until physically displaced. The high part of the cam 91 is so positioned as to correspond with the terminal parts of the record. When the record has finished playing and the operator returns the needle bracket and the tone arm to the normal inoperative position or to the position used for changing records, the arm 85 comes into contact with the stop 98 carried by the insulated ring 88 and this action causes the block 97, which is in fixed relation with respect to stop 98, to move in unison, thereby preserving the inoperative position of the parts indicated in Fig. 16. On the return movement to the inoperative position of the needle carrier 78, the coincident movement of the friction ring 88 brings the end of the finger 96 attached to the dog 95 under the lower portion of the cam 91, raising the end of the dog from the position shown in Fig. 18 to that of the position shown in Fig. 16. Although the dog in this movement ceases to be positively effective to spread apart the contact 86, the spring blades 93 have by this time returned to their normal position in which the contacts 86 remain separated until pressed together by applied force, as in the condition when the finger 85' is pressed against spring arm 92 under the constant urge of the record groove.

In order to maintain the friction ring 88 properly seated under the varying strains, spring fingers 99 and 100 are provided, the latter having an additional extent of surface press upon the upper surface of the ring 88, the springs 99 and 100 being attached to the fixed tone arm support 89.

The tone arm housing 87 is provided with a removable cover 87' to permit ready access to the device shown in Fig. 14 and to permit convenient assembly. The electric wires indicated in Fig. 14 as 101 lead to the switches of the needle carrier 78 while the wires 102 lead to a terminal block whose electric connections are associated with the circuits of the text motor 14 and the picture motor 37 and the lamps 60, 61.

At the rear of the cabinet 1 (see Figs. 6 and 8) is a removable screen 108 fitting at the bottom of the groove 109 and being held in place at the top by latches 110. Through this screen air is drawn in by the suction fan 111 operated by motor 112 having a fixed position within the cabinet. The air sucked in through the screen 108 by the suction fan 111 is delivered through the branch duct 113—114 to the open sides of the frame or casing 68 and the drawer 4 and thereby serve to constantly deliver cool air. A second motor 115 operating an exhaust fan 116 is supported by the frame of the screen 108 and constantly draws warm air from the interior of the cabinet out of the cabinet. In this way a constant circulation of air is established through the cabinet by virtue of which the paper travelling in the drawer 4 is protected against excessive heat from the lamps 60, 61, and the cabinet itself is maintained at moderate temperature.

In the upper part of the cabinet (see Fig. 7) are the conventional needle containers 117, the bracket 118 which keeps the cover 73 in the elevated position, and the lamp 119 which functions when the cover is opened to illuminate the record compartment. Between the tone arm and the loud speaker and associated with the loud speaker are standard electrical installations for radio amplification of sound, the details of which are not illustrated since they are well known and would only tend to confuse.

Current from a source of alternating current is associated with the cabinet at 9 (Fig. 5) and the current from said source is then distributed in accordance with the wiring diagram shown in Fig. 22. 120 is a pilot light.

The effective surface of the roller 15 is set back from the aperture plate 65 to a width corresponding exactly to the width of the paper 11 so that, as shown in Fig. 11, the paper in passing over the roller 15, does not come into contact with the plate 65. In the case of the illustration roll 23 the paper is also maintained out of contact with the plate 65 as indicated in Fig. 12.

As indicated in Fig. 27 the aperture plate 65 is provided with studs 121 upon which the magnet-supporting plate 122 may be temporarily supported during the editor's initial preparation of the master record. The grooves 123 fit over the studs 121 and the plate 122 is then securely held in place by tightening the nuts 124. A plate 125 associated with the plate 122 by the clips 126 supports the carbon paper 20 in proper position with relation to the stylus 19 and the paper strip 11.

Figs. 30 to 32 represent alternative mechanism for that which is involved in the arrangement shown at 40, 41, 43, 44, 45, and 47, 46, 48 of Fig. 9 and the detail view thereof as shown in Figs. 25 and 26. In Figs. 30 to 32 a source of light 130 directs its beams through the condenser 131 against mirror 132. The mirror 132 is set with relation to mirror 133 and mirror 134 in such a way that whenever the light is not interrupted the beams from the source of light 130 will be directed against the photoelectric cell 135. The text roll paper passing over the plate 31 and over the roller 15 will normally prevent beams of light from passing from mirror 134 to the photoelectric cell 135, but when an aperture 22 appears in the paper 11, light will be transmitted from the source of light 130 to the photoelectric cell 135 in the manner indicated in Fig. 30. When this occurs, the photoelectric cell is energized. An amplifying system 136, affected by the cell 135, draws up the solenoid 137 to the position shown in Fig. 30 and in so doing advances the ratchet 138 through pawl 139 in such a way as to bring the contacts 140 and 141 upon a conducting part 142 of the insulated drum 143, causing the motor 37 to become operative to draw the illustration roll 23 from the reel 23' to the reel 36. As soon as the aperture of the text roll 11 moves forward, the beam from mirror 134 to the cell 135 is interrupted, the solenoid 137 drops under the influence of the spring 144, the drum 143, however, remaining in the position illustrated in Fig. 30. When thereupon the illustration roll has been drawn to proper position by the continued operation of the motor 37 and aperture 25 of the illustration sheet comes in line between the source of light 130 and the cell 135, the cell is again energized and the solenoid 137 again drawn up, this time causing a movement of the drum 143 to a position where the contacts 140 and 141 both fall upon an insulated portion of the drum 143, whereupon current to the motor 37 is interrupted and the motor stops, its momentum, however, resulting in advancing the illustration roll aperture 25 just beyond the line of the beams from the light 130 to the cell 135. The cell 135 now being unaffected by light, the solenoid again drops to the lower position and the mechanism 137, 143, etc. remains idle until the next aperture of the text roll causes a repetition of the cycle.

In the train of gears 13 (Figs. 9, 10, and 13) the stud 13' supports besides the driving gear 13'', the ratchet wheel 26. The pawl 27, supported on the driving gear 13'', engages the teeth of the ratchet wheel 26 (see Fig. 13). This arrangement allows the operator in installing the text roll sheet to bring the paper into proper position with respect to the shutter aperture 64 for starting and for properly aligning, since in the initial adjusting of the reel 12 only the ratchet wheel 26 will be rotated without causing movement of the gear 13'', while, when the motor 14 begins its operations, the pawl 27 will engage the ratchet 26 and positively drive the gear 13'' through said pawl.

A pivoted L-shaped lever 74, adapted to be swung over the end of the button 83 as indicated in Fig. 20 enables the operator to maintain the contacts 84 in the open position mechanically whenever the operator is projecting, for example, a lecture interspersed with music.

For such uses, the switch 150 is provided, said switch being manually operated to close the text motor circuit. The text motor, under such circumstances, operates independently of the entire tone system. When a point in such a lecture is reached where a record is to be played, the switch 150 is moved to open the circuit, thereby stopping the progression of the text roll because the contacts 84 remain separated under the influence of the lever 74. When the record or the part thereof which was to be played comes to an end, the switch 150 is manipulated to close the text motor circuit and thereby start the text motor. The switch 150 is also important in connection with the operation of bringing the text roll to its proper starting position. The switch 150 is also used whenever, due to stretch, moisture conditions, or alterations in the paper constituting the text roll, the paper of the text roll at the end of a phonograph record has not kept up its exact synchronism. This is ascertained by placing a mark 8 corresponding to the number of records making up a set of such records on the text roll. If at the end of a phonograph record the mark 8 does not appear on the screen, the switch 150 is operated until said mark 8 appears. Then, when the next record begins to play the text roll will move in synchronism therewith from the correct starting point. In case the text roll runs ahead slightly, the switch 170 may be operated to stop the movement of the text roll for a brief period of time until the music and text is again in correct synchronized relation.

At the bottom of the cabinet 1 is the switch 58 normally open in the position shown in Fig. 4 but adapted on being depressed to short circuit the resistance 59 so as to reduce the light of the lamps 60 during the period of changing rolls. When the drawer 4 is moved from the position of Fig. 4 to that of Fig. 5 it bears against the switch 58 as shown in Fig. 5 and thereby permits the electric current of the system to flow through its circuits without the necessity of passing through the resistance coil 59.

Associated with the frame 68 there is a housing 103 for the terminal block 104, the terminals of said block being in turn connected by cables 105 and 106 (see Figs. 7 and 22) which communicate with the terminal block 107. This arrangement permits the swinging of the drawer 4 without disturbing or interfering with the electric contacts.

A plug 171, similar to plug 9 enables the apparatus to be used as an electric phonograph alone, the circuits for the text motor and the illustration motor being inactive whenever plug 171 is actuated.

When the text roll is used, for example, for reproducing a continuous lecture, story, or book, the individual lines of the text are printed so that they will be closer together at the beginning of the lecture than at the end, the spacing gradually increasing in accordance with the increasing rapidity of the feed of the paper roll due to the building up of the text paper on its wind-up roll which, gradually growing larger, naturally draws the paper from the text roll more rapidly as the end of the roll approaches. The relation of the printed matter on the roll with reference to the speed of the feed should be such that a speed of approximately one hundred and seventy-five to two hundred and seventy-five words per minute will be fed to the screen. At this rate, as experiments have determined, the human eye is comfortably and without strain able to follow the text naturally and without any noticeable effect as between the relatively slower feed when the text roll is full wound and its take-up roller just beginning to function, and when the text roller is almost unwound and its take-up roller almost filled.

In Fig. 22 of the drawings there is represented in diagrammatic form the wiring system of the entire instrument. This wiring diagram is shown as being in the operating position in which the main circuit switch 200 is closed. In this position the current is on through exhaust motor 115 and the current is also on through the fan motor 112 and the light switch 201.

The circuit in which the light switch 201 is located has connections leading from the positive line of switch 200 to terminal A of the terminal block 107, through cable 105 to terminal A' of terminal block 104, to D' of 104, to lamp 60 (which casts light on the text and illustration rolls in the draw 4), back to terminal F' of block 104 through cable 105 to terminal F of block 107, through switch 58 to terminal G of block 107 to light switch 201 and back to the negative line of the main switch 200. In this system is included the resistance 59 for dimming the light 60 when the drawer 4 is open for placement or replacement of text or illustration rolls.

From switch 200 the positive line leads also to terminal D' of block 104 through lamp 61 (which supplements the light of lamp 60 in the drawer 4 when the drawer is in closed position) to terminal H' of block 104 through cable 106 to terminal H of block 107 to lamp switch 202 and back to the negative line. The switch 202 is manually operated when the drawer 4 is brought to its open position to shut off lamp 61 to decrease its heat and glaring effect, the lamp 60 being meanwhile in its dimmed condition resulting from the cutting in of resistance 59 on releasing contact 58 when the drawer 4 begins to be opened.

Current for the text motor 14 passes from positive terminal A' of block 104 through B' through text motor 14 to terminal E' through cable 105, terminal B of block 107, C of 107, through line 102 through tone arm contacts 82, 84, 86, through correction switch 170 and back to the negative side of the line.

Current for the illustration motor 37 passes from the positive terminal A' of block 104 through C' through illustration motor 37 to terminal G' through cable 105, terminal E of block 107 through magnet switch terminals 53 and 54 to the negative side of the line. The circuit which closes the magnet switch terminals 53 and 54 is the circuit from the positive line of switch 200 through transformer 203, transformer switch 160 and back to the negative side of the line. The transformer 203 supplies low voltage current through terminal J of block 107, through cable 106, terminal J' of block 104, to switch 40, through contacts 43 and 45 (functioning through the apertures 22 in the text roll 11) back to terminal I' of block 104, through cable 106, terminal I of block 107, (energizing magnet 50) and back to the transformer 203.

The energization of magnet 50 closes the switch contacts 53 and 54, placing into operation, by the circuits heretofore described, the illustration motor 37. This motor 37 will continue to run until an aperture 25 of the illustration roll 23 permits closing of switch 47 through contacts 46 and 48 (see Fig. 9). When this occurs a circuit will be established through terminal K' of block 104, cable 106, terminal K of block 107, said circuit energizing magnet 55 (see Fig. 26) breaking switch contacts 53 and 54 and thereby breaking the circuit which leads through the motor 37.

Whenever it is desired for any reason to momentarily stop the text motor (as for example to correct a slight inaccuracy in the correlation of the projected text and the music) the correction button 170 is manually operated to break the circuit through the text motor 14.

Whenever it is desired to provide for an independent operation as between phonograph on the one hand and the text and/or illustration rolls, switch 150 is closed, short-circuiting switches 82, 84, and 86 of the tone arm mechanism (which ordinarily synchronize the operation of the phonograph turn-table 76 with the text motor 14) and thereafter permits independent manual control and operation of the phonograph.

The pilot light 120 in the tone arm switch circuits indicates that the tone arm circuit is functioning and that the circuit to the text motor 14 is on and that the two circuits are in a condition to properly perform their respective functions.

I claim:

1. Apparatus for the display of informative matter for visual observation comprising a reel, a roll on said reel having vertically disposed lines of printed matter thereon, the individual lines of such printed matter having gradually increasing spacings therebetween a wind-up reel, a motor for moving said reels continuously and uninterruptedly at a constant rate of speed, and speed changing mechanism operatively connecting said motor with said reels for moving said reels at such rates as to impart to said roll speeds within limits determined by the spacing between the individual lines of such printed matter, such that the lines of printed matter are exhibited at a predetermined constant rate of speed sufficiently high to avoid tedium and yet not so high as to exceed the spectators' capacity to absorb the printed matter.

2. Apparatus for the display of informative matter in predetermined relation with reference to an effect to be produced, comprising, in combination, a reel, a roll bearing vertically disposed phrases or lines of printed matter in convenient form and mounted on said reel, the individual lines of such printed matter being variably spaced in predetermined relation from beginning to end, a wind-up reel for said roll, means to project vertically the lines of said printed matter in a slowly advancing sequence, said means comprising supports for said reels disposed one above the other, a motor for rotating said reels at a predetermined constant rate of speed, and speed changing mechanism operatively connecting said motor with said reels for moving said reels at such rates as to impart to said roll speeds within limits determined by the spacings by the individual lines of printed matter, such that the lines of printed matter are exhibited at a predetermined constant rate of speed not exceeding approximately two hundred and seventy-five words per minute.

3. An educational or amusement system for the projection of informative matter such as writings, illustrations, or the like in predetermined time relation with reference to an effect to be produced, comprising, in combination, a reel having mounted thereon a roll bearing printed matter in convenient form, means to project said printed matter at a predetermined rate of sequence, a reel having mounted thereon a roll bearing illustrations, and means cooperating with said roll of printed matter to project said illustrations in synchronism with said printed matter.

4. An educational or amusement system for the projection of informative matter such as writings, illustrations, or the like in predetermined time relation with reference to an effect to be produced, comprising, in combination, a reel having mounted thereon a roll bearing printed matter in convenient form, means to project said printed matter at a predetermined rate of sequence, a reel having mounted thereon a roll bearing appropriate illustrations to be used in conjunction with said printed matter, and means controlled by means cooperating with said roll of printed matter to project said illustrations intermittently for predetermined time intervals in synchronism with said text.

5. An educational or amusement system for the projection of informative matter such as writings, illustrations or the like in predetermined time relation with reference to an effect to be produced, comprising, in combination, a reel having mounted thereon a roll bearing printed matter in convenient form, the individual lines of which have gradually increasing spacings therebetween, a wind-up reel for said roll, means to project said printed matter in a slowly advancing sequence, the relation of the speed of projection of said means with the printed matter on said roll being such that the speed of feed of said printed matter will not exceed approximately two hundred and seventy-five words per minute, a reel having mounted thereon a roll bearing illustrations, and means controlled by means associated with said roll of printed matter to project said illustrations in synchronism with said printed matter.

6. An educational or amusement system for the projection of informative matter such as writings, illustrations or the like in predetermined time relation with reference to an effect to be produced, comprising, in combination, a reel having mounted thereon a roll bearing printed matter in convenient form, the individual lines of which are variably spaced from beginning to end, a wind-up reel for said roll, means to project the lines of said printed matter in a slowly advancing sequence, the relation of the speed of projection of said means with the printed matter on said roll being such that the speed of feed of said printed matter will not exceed approximately two hundred and seventy-five words per minute, a reel having mounted thereon a roll bearing appropriate illustrations to be used in conjunction with said printed matter and means cooperating with said roll of printed matter to project said illustrations intermittently for predetermined time intervals in synchronism with said printed matter.

7. An educational or amusement system for the projection of informative matter such as writings, illustrations, or the like in predetermined time relation with reference to an effect to be produced, comprising, in combination, a reel having mounted thereon a roll bearing printed matter, a wind-up reel for said roll, means for projecting said printed matter in a slowly advancing sequence, the rate of which is determined by the observer's capacity to absorb said printed matter, a reel having mounted thereon a roll bearing illustrations appropriate to said printed matter, a wind-up reel for said illustration roll, and means to project said illustrations intermittently in synchronism with said printed matter, said means comprising operative means adapted to move said roll of illustrations at a predetermined speed, means cooperating with said roll of printed matter to control the starting of said operative means at predetermined intervals, and means associated with said roll of illustrations adapted to render inoperative said operative means when the advancing illustration has synchronized with said printed matter.

8. An educational or amusement system for the projection of informative matter such as writings, illustrations, or the like in predetermined time relation with reference to an effect to be produced, comprising, in combination, a reel having mounted thereon a roll bearing printed matter, a shutter having an aperture, means to continuously move said printed matter past a portion of said aperture at a predetermined speed, a second reel having mounted thereon a roll of illustrations, and means to move said illustrations intermittently past the remaining portion of said aperture in synchronism with said printed matter, said means comprising a circuit including a motor, means controlling the operativeness of said circuit, means cooperating with said roll of printed matter to render operative said controlling means to start said illustration motor at predetermined intervals, and means cooperating with said roll of illustrations to render inoperative said controlling means to stop said illustration motor when the advancing illustration has synchronized with said printed matter.

9. In a system for the projection of representations of writings, symbols, or the like, simultaneously with the rendering of sound impressions relative thereto, the combination of a turn-table having a record thereon, a needle carrier having a needle therein, a tone arm supporting said needle carrier, a reel having mounted thereon a roll bearing printed matter, the individual lines of which are variably spaced from beginning to end, a wind-up reel for said roll, means to continuously and uninterruptedly project said printed matter at a predetermined rate of sequence in synchronism with said sound, means associated with said needle carrier to render said projecting means inoperative while the needle carrier is in its inoperative position, said means being adapted to render said projecting means operative when the needle is placed in position on the sound record, and means associated with said tone arm to render said projecting means inoperative when the needle has reached the end of the record.

10. In a system for the projection of representations of writings, symbols, illustrations, or the like, simultaneously with the rendering of sound impressions relative thereto, the combination of sound-producing means, a reel having mounted thereon a roll bearing printed matter, the individual lines of which are variably spaced from beginning to end, a wind-up reel for said roll, a second reel having mounted thereon a roll of illustrations appropriate to said printed matter and said produced sound, means to project said printed matter and said illustrations in synchronism with said produced sound, and means associated with said sound-producing means to control the projection of said printed matter and illustrations.

11. In a system for the production of representations of writings, symbols, illustrations, or the like, simultaneously with the rendering of sound impressions relative thereto, the combination of sound-producing means, a reel having mounted thereon a roll bearing printed matter, means to project said printed matter at a predetermined rate of sequence in synchronism with the produced sound, a reel having mounted thereon a roll bearing appropriate illustrations to be used in conjunction with said roll of printed matter and produced sound, means to project said illustrations intermittently in synchronism with said printed matter and produced sound, and means associated with said sound-producing means to control the projection of said printed matter and illustrations.

12. In a system for the production of representations of writings, symbols, illustrations or the like, simultaneously with the rendering of sound impressions relative thereto, the combination of sound-producing means, a reel having mounted thereon a roll of printed matter in convenient form, means to project said printed matter at a predetermined rate of sequence in synchronism with said sound-producing means, a reel having mounted thereon a roll bearing appropriate illustrations to be used in conjunction with said printed matter and said produced sound, means controlled by means cooperating with said roll of printed matter to project said illustrations in synchronism with said printed matter and means associated with said sound-producing means to control the projection of said printed matter and illustrations.

13. In a system for the production of representations of writings, symbols, illustrations, or the like, simultaneously with the rendering of sound impressions relative thereto, the combination of sound-reproducing means, a reel having mounted thereon a roll of printed matter in convenient form appropriate to said produced sound, the individual lines of said printed matter having gradually increasing spacings therebetween, means to project said printed matter at a predetermined rate of sequence in synchronism with said sound-producing means, a reel having mounted thereon a roll bearing appropriate illustrations to be used in conjunction with said printed matter and said produced sound, means controlled by means cooperating with said roll of printed matter to project said illustrations intermittently for predetermined time intervals in synchronism with said printed matter, and means associated with said sound-producing means to control the projection of said printed matter and illustrations.

14. In a system for the production of representations of writings, illustrations, or the like, simultaneously with the rendering of sound impressions relative thereto, the combination of apparatus for projecting such representations, comprising a reel having mounted thereon a roll of printed matter to be projected, a second reel having mounted thereon a roll of illustrations to be projected, a shutter having an aperture, a source of light illuminating the portions of said rolls exposed through the aperture in said shutter, a lens, a mirror for reflecting the images from said strips through said lens, a motor for advancing the printed matter roll, a motor for the illustration roll, means controlled by means associated with said printed matter roll to control the starting of said illustration motor, said means being also controlled by means associated with said illustration roll to control the stopping of said illustration motor, and apparatus for the rendition of oral passages in predetermined relation with the operation of the projecting apparatus with reference to a combined visual and oral effect to be produced.

15. In a system for the production of representations of writings, symbols, or the like, simultaneously with the rendering of sound impressions relative thereto, the combination of apparatus for projecting such representations, comprising a reel having mounted thereon a roll of printed matter to be projected, a motor for advancing said printed matter roll at a predetermined speed, sound-producing mechanism comprising a turntable upon which is mounted a record appropriate to the contents of said roll, a motor to rotate said table in synchronism with the movement of said printed matter, a needle carrier having a needle therein, a tone-arm supporting said needle carrier, means associated with said tone-arm adapted to maintain said printed matter motor inoperative while said tone-arm is in inoperative position, a second means associated with said tone-arm adapted to operate said first means to allow the printed matter motor to advance said printed matter roll simultaneously with the placing of the needle on the record, said second means being adapted to render inoperative said first means to stop said printed matter motor when the record is finished.

16. In a system for the production of representations of writings, symbols, or other text, simultaneously with the rendering of sound impressions relative thereto, the combination for projecting said representations comprising a shaft, a roll of text mounted thereon, means comprising a circuit containing a motor to move said text at a suitable speed, sound-reproducing mechanism comprising a turntable, a motor to rotate said table in synchronism with said text, a needle carrier having a needle therein, a tone-arm supporting said needle carrier, a pair of contacts in said text motor circuit mounted on said needle carrier, a button adapted to keep said contacts open when said needle carrier is in an inoperative position, a friction ring encircling the base of and adapted to move with said tone-arm, a pair of spring contacts in said text motor circuit mounted on said friction ring, an arm attached to said tone-arm adapted to bear against and close said spring contacts when said tone-arm is moved into operative position, a second pair of contacts in said text motor circuit mounted on said needle carrier, a button adapted to keep said contacts open until the needle in said carrier is in its proper place on the record, an insulated dog pivotally mounted between said spring contacts, a cam mounted on said tone-arm, a spring projection on said dog adapted to engage the under side of said cam, said cam being so designed that it holds said dog in inoperative position during the playing of the record and when the latter is finished releases said dog, thus allowing it to drop and open said spring contacts and a stop mounted on said friction ring adapted to keep said arm a predetermined distance from said spring contacts while said tone-arm is moved to its inoperative position.

17. An educational or amusement system for the projection of informative matter such as writings, illustrations, or the like in predetermined time relation with reference to an effect to be produced, comprising, in combination, a shaft, a roll of text mounted thereon, a shutter having an aperture, means comprising a motor to continuously move said text past the upper portion of said aperture at a predetermined speed, a second shaft, a roll of illustrations mounted thereon, and means to intermittently move said illustrations past the remainder of said aperture in synchronism with said text, said means comprising a circuit including a motor, a shaft, an insulated drum mounted thereon having conducting strips on the periphery thereof, a pair of contacts in said motor circuit adapted to bear on the periphery of said drum, a ratchet attached to said drum, means to rotate said drum so that said contacts alternately bear on said conducting and insulated portions of said drum, said means comprising a source of light, a condenser through which the beams of light from said source are directed, a plurality of mirrors on one side of said rolls of text and illustrations, so positioned that said beams of light from said condenser are directed on predetermined portions of said rolls, said roll of text and said roll of illustrations normally preventing said beams from passing through, perforations in said roll of text at predetermined intervals to allow the beam directed thereon to pass through, perforations in said illustrated roll adjacent said illustrations to allow the beam directed thereon to pass through, a photo-electric cell on the opposite side of said rolls so positioned that it is in the path of either beam, a circuit containing an amplifier to amplify the energized current in said photo-electric cell, a spring-tensioned solenoid in said amplifier circuit, a lever pivoted on said drum shaft and attached to said solenoid, a pawl pivoted on said lever adapted to engage said ratchet to rotate said drum a predetermined amount when said solenoid is energized, and a second pawl adapted to hold said drum in its rotated position.

18. An educational or amusement system for the projection of informative matter such as writings, illustrations or the like in predetermined time relation, with reference to an effect to be produced, comprising, in combination, a shaft, a roll of text mounted thereon, a shutter having an aperture, means comprising a motor to continuously move said text past the upper portion of said aperture at a predetermined speed, a second shaft, a roll of illustrations mounted thereon, and means to intermittently move said illustrations past the remainder of said aperture in synchronism with said test, said means comprising a circuit including a motor, a pair of contacts in said motor circuit, an electro-magnet having an armature, the free end of said armature forming a support for one of said contacts, a second electro-magnet having an armature, a hook-like portion on the free end of said second armature adapted to engage the free end of said first armature to normally hold said contacts open, a second pair of contacts to close the circuit containing said second electro-magnet, thus releasing said first armature and allowing said first contacts to close, said second pair of contacts being so positioned that said roll of text moves between them, thus rendering them normally inoperative, one of said contacts comprising a spring tensioned roller adapted to bear on said roll of text, apertures on said roll of text spaced at predetermined intervals to allow said contacts to close, thus energizing said second electro-magnet, a third pair of contacts to close the circuit containing said first electro-magnet, said third pair of contacts being so positioned that said roll of illustrations moves between them, thus rendering them normally inoperative, one of said contacts comprising a spring-tensioned roller adapted to bear on said roll of illustrations, apertures in said roll adjacent each illustration to allow said contacts to close, thus energizing said first electro-magnet to open said first pair of contacts and stopping said illustration motor.

19. Apparatus for the display of informative matter in predetermined relation with reference to an effect to be produced comprising, in combination, a roll having reproducible reading matter thereon, a second roll bearing illustrations coordinated in sequence with the reading matter on said first roll, means to project such illustrated matter in connection and simultaneously with said reading matter, means to continuously and uninterruptedly feed the reading matter on said first roll to said projecting means, means to intermittently feed the illustrated matter on said second roll to said projecting means, and means on said first roll to control the intermittent movement of said second roll whereby on projection of said rolls the reading matter is shown in a continuous and uninterrupted sequence on the screen while said illustrations are caused to appear intermittently in synchronism with appropriate reading matter.

20. Apparatus for the display of informative matter in predetermined relation with reference to an effect to be produced comprising, in combination, a roll bearing reproducible reading matter, said roll having portions thereof at predetermined intervals unobstructive to the passage of electric or light energy, a second roll bearing illustrations coordinated in sequence with the reading matter on said first roll, means to project said illustrative matter in connection and simultaneously with the reading matter on said first roll, means to feed continuously and uninterruptedly the reading matter on said first roll to said projecting means, means to feed the illustrative matter on said second roll to said projecting means, and means controlled by the predetermined spaced portions on said first roll to control the operation of the feeding means for said second roll whereby said illustrations are caused to appear intermittently in synchronism with appropriate reading matter.

21. Apparatus for the display of informative matter in predetermined relation with reference to an effect to be produced comprising, in combination, a roll bearing reproducible reading matter, said roll having portions thereof at predetermined intervals unobstructive to the passage of electric or light energy, a second roll bearing illustrations coordinated in sequence with the reading matter on said first roll, said second roll having portions thereof adjacent the illustrations unobstructive to the passage of electric or light energy, means to project said illustrative matter in connection with and simultaneously with said reading matter, means to feed the illustrative matter on said second roll to said projecting means, operative means controlled by the predeterminately spaced portions on said first roll to control the starting of said feeding means whereby an illustration appropriate to the reading matter projected is advanced, and means controlled by the unobstructed portions on said second roll adapted to render inoperative said feeding means when the advancing illustration has synchronized with said reading matter.

22. The combination of a phonographic system, a roll of fabric, a take-up roll to take up the fabric from the first roll, means to revolve the take-up roll at a constant and uniform speed during the playing of the phonographic record, a second fabric roll bearing subject matter to be projected on a screen, a light system for causing such projection, means associated with the first fabric roll to cause actuation of the second fabric roll, and means associated with the second fabric roll to control the advance of the fabric from said second fabric roll to a predetermined distance and then to cease functioning until again actuated by an impulse originating from the first fabric roll.

23. The combination comprising a roll of fabric bearing printed matter to be projected on a screen, said printed matter being pertinent to subject matter projected from a second fabric roll, a take-up roll to take up the fabric from the first roll, means to revolve the take-up roll at a constant and uniform speed, a second fabric roll bearing subject matter to be projected on a screen and pertinent to the subject matter of the first fabric roll, a light system for causing projection of the subject matter of the two fabric rolls simultaneously, means associated with the first fabric roll to cause actuation of the second fabric roll, and means associated with the second fabric roll to control the advance of the fabric from said second fabric roll to a predetermined distance and then to cease functioning until again actuated by an impulse originating from the first fabric roll.

24. The combination of a phonographic system for the projection of music including vocal parts, a fabric roll bearing the text of such vocal parts, said text being arranged in a sequence of lines, each line corresponding to a short unit of musical phrasing, means to cause the roll to unwind automatically and in synchronism with the beginning of the playing phonographic record, a light system for projecting the text from the roll upon a screen, the spacing of the lines on the roll and the rate of feed of fabric from said roll being so coordinated with the rate at which the phonograph record is played that each portion of the text pertinent to each vocal musical phrase will become visible on the screen simultaneously with the beginning of the vocal phrase as emitted from the record, and automatic means to stop movement of the roll in synchronism with the end of the record.

25. An instrument such as set forth in claim 24, said instrument including a second fabric roll bearing projectable subject matter pertinent to that of the phonographic record, means associated with the first fabric roll to cause actuation of the second roll, means associated with the second fabric roll to control the advance of fabric from said roll to a predetermined distance and to cease functioning until again actuated by an impulse originating from the first fabric roll.

26. An instrument such as set forth in claim 24, said instrument including a manually operatable control over the speed of the fabric roll for making periodic slight corrective adjustment of such speed to assure constancy of the appearance on the screen to each line of text simultaneously with the beginning of each vocal phrase as emitted from the phonographic record.

27. The combination of a text roll bearing consecutive lines of text, a take-up roll for the fabric from the first roll, means to move the text roll at a continuously constant speed, means for projecting the text from the first roll upon a screen, the means to move the take-up roll being arranged to limit the rate of feed of text into the screen at the point of maximum speed of the text roll fabric to a speed approximating and not materially in excess of two hundred and seventy-five words per minute.

28. The combination of a cabinet, a phonographic system therein, a light-projecting system in said cabinet, a motor for the phonographic record, a replaceable roll of fabric and a replaceable take-up roll therefor associated with the light-projecting system, a motor for rotating the take-up roll at a constant speed, and means in the cabinet for causing the text of the fabric roll to be projected in synchronism with the sounds emitted from the phonographic record, to start movement of the text roll simultaneously with the starting of the record and to stop movement of the text roll simultaneously with the end of the record.

29. The combination of a cabinet, a phonographic system therein, a light-projecting system in said cabinet, a motor for the phonographic record, a replaceable roll of fabric and a replaceable take-up roll therefor associated with the light-projecting system, a motor for rotating the take-up roll at a constant speed, means in the cabinet for causing the text of the fabric roll to be projected in synchronism with the sounds emitted from the phonographic record, to start movement of the text roll simultaneously with the starting of the record and to stop movement of the text roll simultaneously with the end of the record, said light-projecting system further including a second fabric roll bearing projectable subject matter, means associated with the first fabric roll to cause actuation of the second roll, means associated with the second fabric roll to control the advance of fabric from said roll to a predetermined distance and to cease functioning until again actuated by an impulse originating from the first fabric roll.

ALBERT E. WIER.